United States Patent Office 3,268,300
Patented August 23, 1966

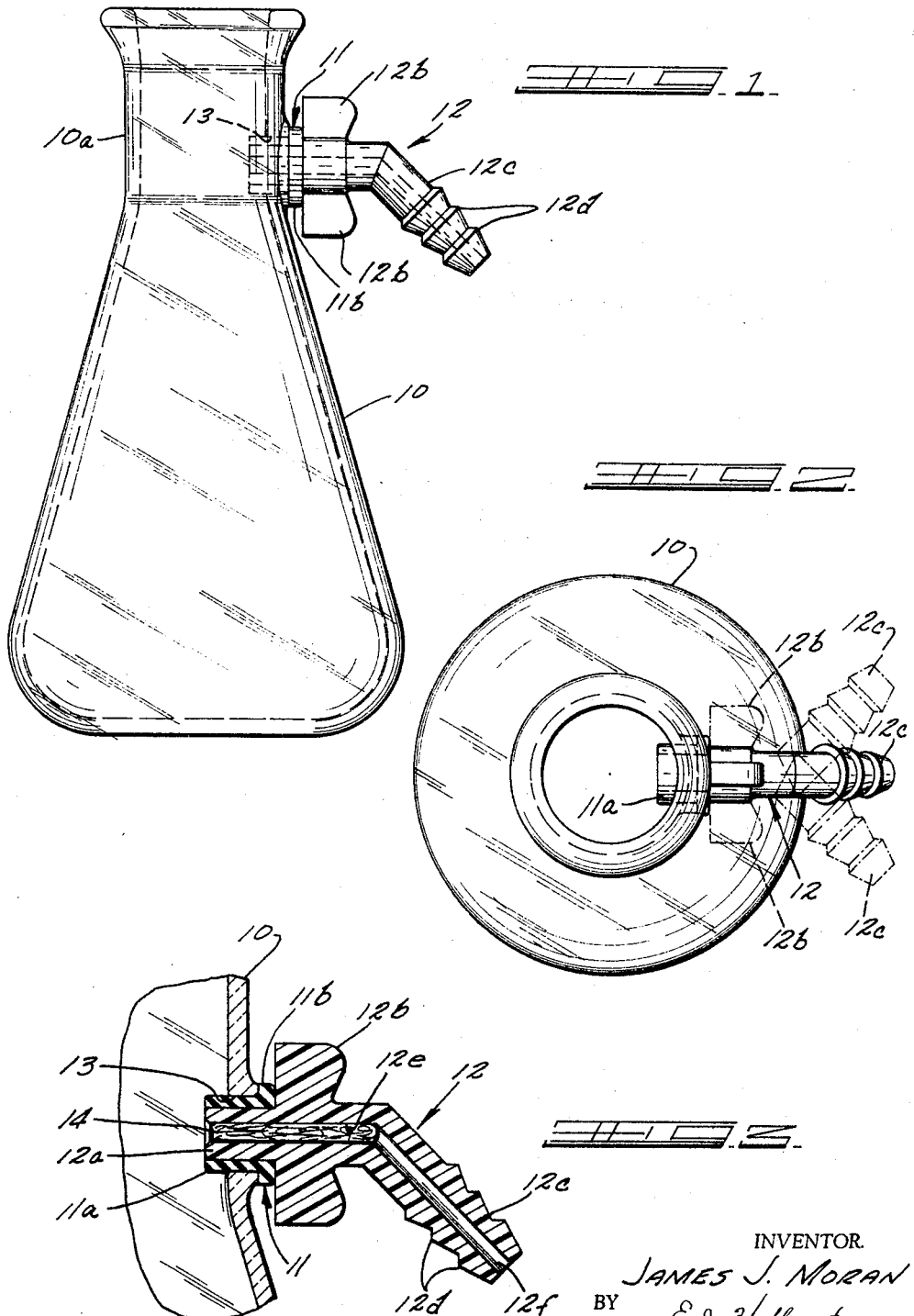

3,268,300
FILTER FLASK ASSEMBLY
James J. Moran, Vineland, N.J., assignor to Owens-Illinois, Inc., a corporation of Ohio
Filed May 15, 1963, Ser. No. 280,698
1 Claim. (Cl. 23—292)

The present invention relates to vessel assemblies most commonly employed for laboratory purposes, and more particularly to laboratory filtering flasks made of chemically-resistant material such as glass, glass-ceramic and the like, although it is equally applicable to containers made of other materials.

Heretofore, filtering flasks have been provided with an integral tubular sidearm portion provided in a neck region to facilitate connection to a length of resilient tubing or hose leading to a vacuum line. Such integral sidearm which normally extends at a right angle has been subject to breakage when the flask is inadvertently tipped or pulled over by the weight of the connecting hose. Sidearm breakage is the most common cause of damage to such filtering flasks where the same are fabricated of vitreous materials such as borosilicate glass. It is the purpose of this invention to obviate the difficulties presented by the prior art constructions.

Accordingly, it is an object of this invention to provide a filter flask assembly which is equipped with a detachable and damage-resistant sidearm portion.

Another object of this invention is to provide a filter flask construction of simple and novel design including a separable angular sidearm element which is capable of being angularly rotated to extend the sidearm in a variety of directions.

Another object of the invention is to provide a filter flask having an impact-resistant detachable sidearm construction which is capable of providing vacuum-tight interconnection with the flask, being rotated angularly with respect thereto and retaining a plug of fibrous material to prevent contamination of the flask contents subsequent to sterilization.

The specific nature of this invention, as well as other objects and advantages thereof, will become apparent to those skilled in the art from the following detailed description taken in conjunction with the annexed sheet of drawings on which, by way of preferred example only, is illustrated the preferred embodiments of this invention.

In the accompanying drawing:

FIG. 1 is a side elevational view of an assembly embodying the invention;

FIG. 2 is a plan view illustrating in broken lines various angular positions of the sidearm; and FIG. 3 is an enlarged fragmentary sectional view illustrating the sidearm portion of the assembly.

The filter flask assembly as illustrated in FIG. 1 consists of a vessel or container 10 having the shape of an Erlenmeyer flask, a grommet 11, and a sidearm 12 disposed within the grommet. The flask 10 has an aperture 13 formed in a localized sidewall region of its cylindrical neck portion 10a. Preferably the aperture is circular in cross-section and located in a lowermost region of the neck, although alternately it may have a modified configuration and location.

Grommet 11 is comprised of resilient material such as chemically-resistant elastomeric material. One suitable mtaerial has been found to be synthetic rubber such as neoprene having a Shore durometer hardness, Type A Scale, ranging from about 50 to 100. Grommet 11 has an exterior diameter slightly greater than and complemental to aperture 13 and an exteriorly-projecting annular flange portion 11b adapted to contact the adjacent exterior sidewall surfaces surrounding the aperture. Grommet 11 has a circular passage therein regardless of the complemental contours of its exterior and the flask aperture surfaces. Tubular sidearm 12 is comprised of several lineal portions which form an obtuse angle having a continuous passage therethrough. The supported end portion 12a of the sidearm has a circular contour complemental to the interior surfaces of grommet 11 and is capable of forming a vacuum-tight connection therewith. A pair of exteriorly-projecting juxtaposed lugs or ears 12b project from the sidearm adjacent its supported end 12a. The cantilevered angular portion 12c of the sidearm terminates in a series of exteriorly projecting ribs or beads 12d in the form of serrations with a frusto-conical contour at the extremity of its free end. An axial passage 12e is provided in the supported end having a greater diameter than an interconnecting axial passage 12f in the projecting end. A plug 14 of fibrous material such as cotton or glass fibers may be inserted within larger passage 12e which due to the constricted nature of passage 12f is prevented from being pulled outwardly by the application of vacuum. Plug 14 of fibrous material may or may not be utilized within the sidearm as desired or required. Sidearm 12 is preferably comprised of a chemically-resistant synthetic resin such as polypropylene, polyethylene, polystyrene or the like having properties capable of withstanding autoclaving time and temperatures without degradation or deformation.

As shown in FIG. 2 exteriorly-projecting lugs or ears 12b are integrally formed in juxtaposed relation on the sidearm to permit axial rotation of the supported portion with the projecting end of portion then being extended in a variety of directions. The projecting free end 12c can be directed forwardly or rearwardly as illustrated or at any angle through a full circle.

The combined assembly is suitable for general laboratory use and in addition may be sterilized for special purposes where the interior of the flask or contents must be sterile. The sidearm member 12 and grommet 11 are fully capable of being autoclaved without deterioration or loss of seal. The sidearm provides a pocket for fibrous plug 14 wherein suction can be applied to the sidearm and flask through the attached hose and the plug is maintained in place. The several projections on the sidearm serve as finger grips to assist in insertion or removal of the sidearm and to provide leverage to rotate the arm from side-to-side simultaneously with the application of longitudinal or axial force applied by the fingers. The projections also serve to orient the free end in proper angular relation.

All elements of the combined assembly are simple to manufacture, assemble and disassemble for easy cleaning and replacement. The ready removability of the sidearm and grommet and the flexibility of the joint prevents breakage of the assembly in conventional use. Laboratory tests of the prescribed construction have indicated the ability of the side arm to retain the cotton plug and still permit evacuation of the flask during filtering operations.

Normally sterility is not necessary in ordinary laboratory filtration, however there are occasions when the flask interior must be sterilized prior to its use and kept sterile during filtration operations. All components of the subject assembly will withstand sterilization and provided a cotton plug is previously inserted in the sidearm along with a stopper closing the mouth portion, the combination may be sterilized as a unit and maintained in such condition interiorly.

As will be apparent from the above description considerable variation from the described and illustrated embodiment of the filter flask assembly may be resorted to within the spirit and scope of the appended claim.

I claim:

In a filter flask assembly, the combination of an Erlenmeyer flask comprised of chemically-resistant material having a generally frusto-conical shaped body portion and a relatively large-diameter cylindrical-shaped neck portion, a circular aperture formed in a localized sidewall region of said neck portion, a sleeve member comprised of heat and chemically-resistant elastomeric material disposed within and having a diameter complemental to said aperture and an enlarged exteriorly-disposed cylindrical flange portion having a diameter greater than said aperture, and a tubular arm member comprised of chemically-resistant synthetic plastic material having lineal portions forming an obtuse angle with one end portion supported coaxially within said sleeve member and said aperture, said tubular arm member having a continuous passage with greater internal diameter in its supported end portion than in its cantilevered end portion, said arm member having a pair of juxtaposed exteriorly-projecting lug elements disposed adjacent its supported end portion to facilitate rotation of said arm member with respect to said aperture for multiangular positioning of said cantilevered portion, the terminating end portion of said cantilevered portion having a generally frusto-conical shape with a series of exteriorly-projecting transverse ribs adjacent thereto.

References Cited by the Examiner

E. H. Sargent & Co. Catalogue, Supplement 62, page 11, Model No. S-34369; date of publication, March 1962.

Cole-Parmer Instrument & Equipment Co., Developments, page 9, Model No. 6290; date of publication, September 1959.

MORRIS O. WOLK, *Primary Examiner.*

JOSEPH SCOVRONEK, *Examiner.*

H. A. BIRENBAUM, *Assistant Examiner.*